United States Patent

Nakayama et al.

Patent Number: 6,086,981
Date of Patent: Jul. 11, 2000

[54] MAGNETIC RECORDING MEDIUM

[75] Inventors: Kazuhiko Nakayama; Katsumi Endoh; Takashi Ishii; Takeshi Miyamura; Osamu Yoshida, all of Tochigi-ken, Japan

[73] Assignee: Kao Corporation, Tokyo, Japan

[21] Appl. No.: 09/188,395

[22] Filed: Nov. 10, 1998

[30] Foreign Application Priority Data

| May 8, 1998 | [JP] | Japan | 10-126525 |
| May 11, 1998 | [JP] | Japan | 10-127736 |
| Jul. 22, 1998 | [JP] | Japan | 10-206962 |

[51] Int. Cl.$^7$ ................................................. G11B 5/716
[52] U.S. Cl. ..................... 428/212; 428/328; 428/336; 428/694 BM; 428/900
[58] Field of Search .................. 428/212, 328, 428/336, 694 BM, 900

[56] References Cited

U.S. PATENT DOCUMENTS

| 5,496,607 | 3/1996 | Inaba et al. | 428/65.3 |
| 5,645,917 | 7/1997 | Ejiri et al. | 428/694 |
| 5,756,148 | 5/1998 | Ejiri et al. | 427/128 |
| 5,763,046 | 6/1998 | Ejiri et al. | 428/141 |
| 5,776,590 | 7/1998 | Yamazaki et al. | 428/212 |
| 5,780,141 | 7/1998 | Ejiri et al. | 428/694 |
| 5,792,543 | 8/1998 | Ejiri et al. | 428/694 |

FOREIGN PATENT DOCUMENTS 5-334652  12/1993  Japan .

OTHER PUBLICATIONS

K. Ejiri, et al., Society of Motion Picture and Television Engineers, No. 137—117, pp., 1–7, "Electromagnetic Characteristics of Metal Particulate Media With a Thin Magnetic Layer", Nov. 10–13, 1992.

Derwent Abstracts, AN 98–038987, JP 9–293230, Nov. 11, 1997.

Derwent Abstracts, AN 97–170780, JP 9–035246, Feb. 7, 1997.

*Primary Examiner*—Stevan A. Resan
*Attorney, Agent, or Firm*—Oblon, Spivak, McClelland, Maier & Neustadt, P.C.

[57] ABSTRACT

A magnetic recording medium comprising a substrate having an uppermost magnetic layer containing ferromagnetic metal powder and a lower magnetic layer which is adjacent to the uppermost magnetic layer, wherein the uppermost magnetic layer has an average dry thickness of 0.03 to 0.5 μm, the ferromagnetic metal powder in the uppermost magnetic layer is orientated in the horizontal direction of the magnetic recording medium, the magnetic recording medium has a coercive force of 120 kA/m or higher in the horizontal direction thereof, and a ratio of a maximum magnetic susceptibility $\chi_{max}$ with an external magnetic field applied in the direction perpendicular to the magnetic recording medium to a magnetic susceptibility $\chi_8$ with an external magnetic field of 8 kA/m applied in the same direction, $\chi_{max}/\chi_8$, is 1.3 or higher.

7 Claims, 1 Drawing Sheet

MAGNETIC RECORDING MEDIUM

BACKGROUND OF THE INVENTION

1. Field of the Invention

The present invention relates to a magnetic recording medium for high-density recording which has excellent electromagnetic characteristics.

2. Related Art

Increasing the density and the capacity of a magnetic recording medium is in other words recording a greater amount of information in unit volume. There are three main approaches that have been taken to this subject. The first one is to shorten the recording wavelength, i.e., to improve linear recording density. The second one is to narrow the width of the recording tracks. The third one is to increase the recording area which corresponds to make a recording medium as thin as possible. These three approaches have been practically combined with each other to realize a high recording capacity. The feature of the present invention will be described below together with the technical trend for obtaining an increased density and capacity in magnetic recording media.

At first, the studies were made to magnetic recording media using an analog recording system. The media are required to have higher output over wide recording wavelengths of from long wavelengths to short wavelengths. Proposed technique to attain the requirement was to form two or more magnetic layers. The technique was initially proposed as an audio tape in the 1970s and advanced later as a high-performance video tape. This technique is designed to comprise a lower magnetic layer having a relatively low coercive force and an upper magnetic layer with a relatively high coercive force in order to obtain high output over wide recording wavelengths. In other words, the lower magnetic layer contributes to output at long wavelengths while the upper magnetic layer contributes to output at short wavelengths.

In the next step to develop high density and high capacity recording media, attention has been paid on digital recording system. In comparison with analog recording media, high output at short wavelengths is more essential for digital recording media. A plural layer coating method is commonly applied, wherein layer structure of recorded side has a thin upper magnetic layer on a lower non-magnetic layer. Many studies and inventions have been made to pursue high output of such media. Some examples are shown below.

According to U.S. Pat. No. 5,496,607, if the thickness of the coated magnetic layer is large, problems of self-demagnetization loss in recording and thickness loss in reproduction are serious. Ejiri et al. described that there was an optimum thickness for the output for each frequency, and the optimum thickness was approximately within the thickness range of ¼ to ⅓ of the recording wavelength at each frequency. (134$^{th}$ SMPTE TECHNICAL CONFERENCE PRINT No.134-117). Considering the wavelength used for high capacity magnetic media is below 1 μm, the optimum thickness proposed by Ejiri lies below 0.3 μm. In any case, formation of a thin upper magnetic layer is required to get high density digital recording media. After all, the magnetic media having the thin upper magnetic layer on a lower non-magnetic layer is, for the present, authorized as recording media with high density and high capacity.

In order to form plural layers of magnetic layer and non-magnetic layer beautifully, it is preferable to apply a simultaneous coating method or a successive wet coating method, called wet-on-wet coating method (U.S. Pat. No. 5,756,148). According to U.S. Pat. Nos. 5,496,607 and 5,645,917, preferable relations between the upper magnetic layer and the lower non-magnetic layer are described as; (1) there exists an interface between the upper magnetic layer and the lower non-magnetic layer, (2) it is ideal that the interface forms a straight line with a constant thickness of layer, (3) no mixed region is allowed to exist between the lower non-magnetic layer and upper magnetic layer.

As for the dispersions (coating compositions), the dispersion of lower non-magnetic layer and the upper magnetic layer are required (a) to have equal or approximate thixotropy and (b) to prevent dynamic formation of a mixed region at the interface between the upper and lower and layers (U.S. Pat. No. 5,792,543). To accomplish these embodiments, several means are shown in U.S. Pat. Nos. 5,792,543, 5,763,046, and 5,780,141.

Among these means, some modification is proposed, wherein the maximum magnetic flux density Bm of the lower non-magnetic layer is controlled between 30 gauss and 500 gauss. In this modification, the lower non-magnetic layer comprises magnetic powder, but it is regarded as "non-magnetic layer": the magnetic powder in this means is incapable of magnetic recording and gives no adverse infuence on the upper magnetic layer (U.S. Pat. No. 5,792,543). In either case, the lower non-magnetic layers described in these inventions are confined to the layers having no contribution on magnetic recording process.

Apart from the above-described structure comprising an upper magnetic layer and a lower non-magnetic layer, U.S. Pat. No. 5,776,590 discloses a structure comprising an upper magnetic layer and a lower magnetic layer adjacent thereto. The magnetic recording medium disclosed in this patent makes it possible to avoid the reduction of output at short wavelengths and to balance the output in both short and long wavelengths, by means of properly selecting the type and the amount of the magnetic powder to be contained in the lower magnetic layer. This medium contains hexagonal tabular magnetic particles whose axis of easy magnetization is perpendicular to the main plane thereof in the lower magnetic layer at a specific ratio. While the technique according to U.S. Pat. No. 5,776,590 may be able to avoid reduction in output at short wavelengths, the demand for an improved output of a magnetic recording medium of coated type at short wavelengths still remains unfulfilled.

The inventors of the present invention have extensively studied and further developed the technique of U.S. Pat. No. 5,776,590, to further improve the output of a magnetic recording medium of coated type at short wavelengths and found, as a result, that the output characteristics at short wavelengths can be improved when the upper and lower magnetic layers satisfy specific conditions. One of the most important conditions is the orientation of magnetic powder contained in the upper and lower magnetic layers.

Various studies have heretofore been given to orientation of magnetic particles for the purpose of improving output at short wavelengths. For example, Japanese Patent Laid-Open No. 334652/93 discloses a magnetic recording medium in which ferromagnetic powder in the magnetic layer is orientated with its axis of easy magnetization being diagonal at an incline of 10 to 65°. According to this technique, however, the diagonal orientation of the ferromagnetic powder in the upper magnetic layer is accompanied with difficulty in securing surface smoothness of the magnetic layer that is required for achieving high-density recording, and the improvement of output reached is limited. Furthermore, magnetic powders that can be used are limited in kind, and the process for manufacturing the magnetic media is complicated.

In the present invention a state of orientation of magnetic powder with which specific magnetic characteristics are manifested can be accomplished by appropriately combining various conditions of forming the upper and lower magnetic layers, such as the conditions for preparing coating compositions, controlled solid concentrations of coating compositions, and drying conditions. Accordingly, a precisely designed orientating apparatus that has conventionally been used is not always required in the practice of the present invention, and the magnetic recording medium of the present invention can be seen as advantageous for mass production.

SUMMARY OF THE INVENTION

It is therefore an object of the present invention to provide a high-capacity recording medium suitable to record data on a computer, in particular, to provide a magnetic recording medium which exhibits satisfactory surface properties and electromagnetic characteristics and is also excellent in productivity.

The inventors have found that the above object can be accomplished by a multilayer magnetic recording medium comprising a substrate having thereon a lower magnetic layer and an uppermost magnetic layer, in which magnetic powder contained in the uppermost magnetic layer is orientated with its axis of easy magnetization in the planar direction, and the orientation of the axis of easy magnetization of magnetic powder contained in the lower magnetic layer and the magnetic characteristics of the lower magnetic layer are controlled so that the ratio of a maximum magnetic susceptibility $\chi_{max}$ with an external magnetic field applied in the direction perpendicular to the magnetic recording medium to a magnetic susceptibility $\chi_8$ with an external magnetic field of 8 kA/m applied in the same direction may be at or above a specific value.

The present invention, being based on the above finding, accomplishes the above object by providing a magnetic recording medium comprising a substrate having an uppermost magnetic layer formed by applying a coating composition comprising ferromagnetic metal powder dispersed in a binder and a lower magnetic layer which is adjacent to the uppermost magnetic layer, wherein the uppermost magnetic layer has an average dry thickness of 0.03 to 0.5 µm, and the ferromagnetic metal powder contained in the uppermost magnetic layer is orientated in the horizontal direction of the magnetic recording medium, the magnetic recording medium has a coercive force of 120 kA/m or higher in the horizontal direction thereof, and a ratio of a maximum magnetic susceptibility $\chi_{max}$ with an external magnetic field applied in the direction perpendicular to the magnetic recording medium to a magnetic susceptibility $\chi_8$ with an external magnetic field of 8 kA/m applied in the same direction, $\chi_{max}/\chi_8$, is 1.3 or higher.

According to the present invention, it is provided a high recording density magnetic recording medium excellent in productivity and satisfactory in surface properties and electromagnetic characteristics, particularly a high recording density magnetic recording medium having excellent electromagnetic characteristics at short wavelengths.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
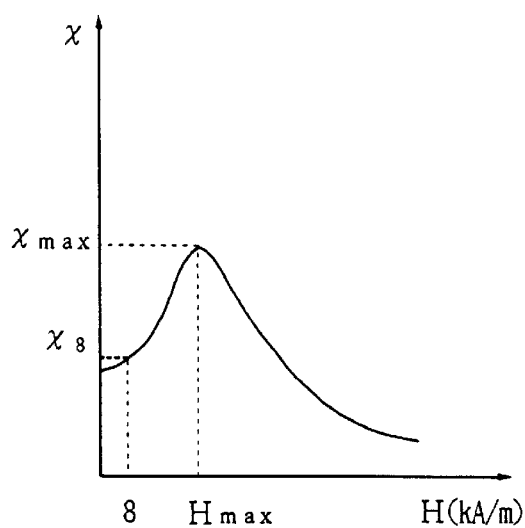
FIG. 1(a) is a magnetic susceptibility versus applied magnetic field curve of the magnetic recording medium according to the present invention.
FIG. 1(b) is a magnetic susceptibility versus applied magnetic field curve of a conventional magnetic recording medium.
Figure 1:
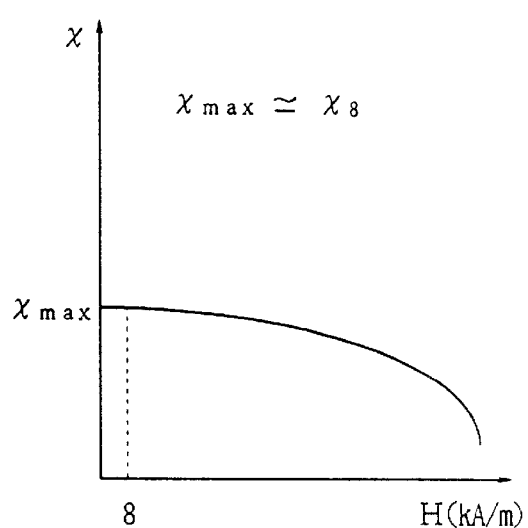

A preferred embodiment of the magnetic recording medium according to the present invention is a multilayered magnetic recording medium of coated type comprising a substrate having thereon a lower magnetic layer and an uppermost magnetic layer (hereinafter sometimes simply referred to as an upper magnetic layer) adjacent to the lower magnetic layer and having on the back side thereof a backcoating layer.

The upper magnetic layer of the magnetic recording medium of the present invention is made of ferromagnetic metal powder dispersed in a binder, in which the ferromagnetic metal powder is orientated in the horizontal direction of the medium. The term "horizontal direction" as used herein means a direction parallel to the plane of the magnetic recording medium. The language "orientated in the horizontal direction" as used herein is intended to mean that the average inclination of the axis of easy magnetization (i.e., major axis) of the ferromagnetic metal powder in the upper magnetic layer is 20° at the most. If the inclination of the axis of easy magnetization exceeds 20°, the surface of the upper magnetic layer tends to be rough, failing to obtain high output. The inclination is preferably 15° or less, still preferably 10° or less. The method for measuring the inclination will be described later.

The axis of easy magnetization of the ferromagnetic powder in the upper magnetic layer can be directed to any in-plane direction as long as it is orientated "in the horizontal direction" of the magnetic recording medium. In preferred embodiments, where the magnetic recording medium is a magnetic tape, the axis of easy magnetization is orientated along the longitudinal direction of the tape; and where the medium is a magnetic disk, the axis of easy magnetization is orientated in a random direction in the plane of the disk.

The upper magnetic layer has an average dry thickness of 0.03 to 0.5 µm. If the thickness exceeds 0.5 µm, self-demagnetization becomes large, making it difficult to obtain a sufficient output in high-density recording. If the thickness is smaller than 0.03 µm, the S/N ratio decreases appreciably. A preferred average dry thickness of the upper magnetic layer is 0.03 to 0.3 µm, particularly 0.05 to 0.2 µm.

The magnetic recording medium of the present invention has a coercive force of 120 kA/m or higher in its horizontal direction. If the coercive force in the horizontal direction is less than 120 kA/m, the output in a short wavelength region may become insufficient. The coercive force is preferably 130 to 270 kA/m, still preferably 140 to 250 kA/m. Where the magnetic recording medium is a magnetic tape, the "coercive force in the horizontal direction" is the coercive force measured along the longitudinal direction of the tape. Where the medium is a disk, the term denotes the greatest of the values measured in random directions in the horizontal plane of the disk.

The greatest feature of the present invention lies in that a ratio of a maximum magnetic susceptibility $\chi_{max}$ with an external magnetic field applied in the direction perpendicular to the magnetic recording medium and a magnetic susceptibility $\chi_8$ with an external magnetic field of 8 kA/m applied in the same direction, $\chi_{max}/\chi_8$, (hereinafter referred to as a susceptibility ratio) 1.3 or higher. Where (a) a magnetic recording medium has a susceptibility ratio of 1.3 or greater, (b) the ferromagnetic metal powder in the upper magnetic layer is in the above-identified horizontally orientated state, and (c) the dry thickness of the upper magnetic layer falls within the above-specified range, the magnetic recording medium exhibits satisfactory electromagnetic characteristics and, as demonstrated in Examples hereinafter given, shows an improved output in short wavelength recording. The terminology "magnetic susceptibility" as used herein denotes a value dM/dH, which is obtained by differentiating an initial magnetization curve, called an M-H curve, prepared from an external magnetic field H applied to a magnetic recording medium in the direction perpendicular thereto and an magnetization M of the medium by the external magnetic field H. More detailed explanation on the method for obtaining the susceptibility ratio will be given in Examples hereinafter described. The term "perpendicular direction" means a direction perpendicular to the plane of a magnetic recording medium.

A conventional magnetic recording medium in which the axis of easy magnetization of magnetic powder is orientated in the horizontal direction of the medium shows a magnetic susceptibility versus applied field curve ($\chi$-H curve) with no clear peak as depicted in FIG. 1(b), giving a susceptibility ratio of about 1.0 to 1.1. On the other hand, the magnetic recording medium according to the present invention shows a convex $\chi$-H curve having a peak as depicted in FIG. 1(a) with a susceptibility ratio of 1.3 or higher. A preferred susceptibility ratio is 2.4 or higher. The upper limit of the susceptibility ratio is not particularly limited, a practically attainable value in the state of the art is about 4.0. It is preferable that the maximum magnetic susceptibility $\chi_{max}$ appears at an external magnetic field in the range of from 80 to 400 kA/m, particularly from 100 to 320 kA/m.

The mechanism which improves the output characteristics of the magnetic recording medium of the present invention is considered to be accounted for as follows in comparison with conventional magnetic recording media.

In the most common single-layered magnetic recording medium (a) having horizontal orientation, the reduction of output due to self-demagnetization loss or thickness loss becomes appreciable as the recording wavelength decreases, e.g., to 1 µm or shorter. In order to cover these losses, a double-layered magnetic recording medium (b) having a lower non-magnetic layer and a thinner upper magnetic layer has been developed. With the medium of this type (b), the output is still insufficient to cope with the advancing high-density recording. Another proposal on the magnetic recording medium (a) is a magnetic recording medium (c) in which the axis of easy magnetization of magnetic powder is orientated slantingly or perpendicularly. However, the medium (c) involves problems of material and equipment for production and difficulty in securing satisfactory surface properties important for short wavelength recording. As a modification of the medium (c), a magnetic recording medium (d) having a lower magnetic layer in which the axis of easy magnetization of magnetic powder is orientated horizontally has been proposed, but it has a small effect on output characteristics and still has the same problems of the medium (c). Reviewing the magnetic recording medium of the present invention compared with these conventional ones, since the ferromagnetic metal powder in the upper magnetic layer is orientated horizontally, high surface smoothness is easily obtained. Further, because the lower magnetic layer adjacent to the upper magnetic layer has strong magnetic flux in the perpendicular direction, it helps the upper magnetic layer be magnetized perpendicularly in a magnetization inversion region to increase the output picked up by a magnetic head. Satisfactory electromagnetic characteristics can be obtained particularly in short wavelength recording (e.g., 0.5 µm or shorter), i.e., high-density recording.

The susceptibility ratio $\chi_{max}/\chi_8$ of 1.3 or higher can be effectively obtained by orientating the axis of easy magnetization of the ferromagnetic powder contained in the lower magnetic layer slantingly or perpendicularly to the horizontal direction of the magnetic recording medium. Specifically, it is preferable to form the lower magnetic layer so as to satisfy the following relationship (1):

$$0.9 \leq Hc\perp_L/Hc_L \tag{1}$$

In relationship (1), $Hc_L$ represents a coercive force [kA/m] of a lower magnetic layer in the horizontal direction of a magnetic recording medium; and $Hc\perp_L$ represents a coercive force [kA/m] of the lower magnetic layer in the perpendicular direction of the magnetic recording medium. If the value $Hc\perp_L/Hc_L$ is less than 0.9, the lower layer has an insufficient magnetic flux in the perpendicular direction for making a sufficient contribution of the lower layer to the improvement on output characteristics. A still preferred value $Hc\perp_L/Hc_L$ is 1.0 or higher.

The inventors have found that the optimum range of $Hc\perp_L$ varies depending on the shortest recording wavelength $\lambda$ [µm] to be recorded. Hence, it is preferred for the magnetic recording medium of the present invention to fulfill the relationship (2) shown below, in which case the magnetized state of the lower magnetic layer is stabilized, and the advantageous effect in improving the output at every recording wavelength is enhanced.

$$190 \times \lambda^{1/5} - 50 \leq Hc\perp_L \leq 190 \times \lambda^{1/5} + 50 \tag{2}$$

It is also preferred that the residual flux density, $Br_L$ [T (Tesla)], of the lower magnetic layer in the horizontal direction and the thickness, t (µm), of the lower magnetic layer satisfy the following relationship (3), in which case the advantageous effect of the lower magnetic layer in the magnetic recording medium having the above specified susceptibility ratio appears to the full.

$$0.02 \leq Br_L \times t \leq 0.3 \tag{3}$$

If the value [$Br_L \times t$] is less than 0.02, the magnetic contribution of the lower magnetic layer to the upper magnetic layer may not sufficiently appear. If it exceeds 0.3, a demagnetization field tends to adversely affect the upper magnetic layer. The value [$Br_L \times t$] is preferably 0.04 to 0.3, still preferably 0.05 to 0.25.

It is preferred that the coercive force $Hc_U$ [kA/m] of the upper magnetic layer in the horizontal direction of the magnetic recording medium and the above-defined $Hc\perp_L$ satisfy the relationship (4) shown below. In this case, noticeable improvement on output characteristics can be obtained particularly upon short wavelength recording of 0.5 µm or shorter, which is favorable to high-density recording.

$$0.6 \leq Hc\perp_L/Hc_U \leq 1.7 \tag{4}$$

If the value [$Hc\perp_L/Hc_U$] is less than 0.6, the magnetization of the lower magnetic layer may tend to be instable. If it exceeds 1.7, cases may occur in which sufficient magnetic recording on the lower magnetic layer cannot be effected with the use of a conventional magnetic head. The value [$Hc\perp_L/Hc_U$] is still preferably 0.7 to 1.5. The value $Hc_U$ itself is preferably 130 kA/m or higher, particularly 135 to 250 kA/m.

In order to horizontally orientate the axis of easy magnetization of the ferromagnetic metal powder in the upper magnetic layer and to increase the magnetic flux in the perpendicular direction in the lower magnetic layer, one or more of the following methods (1) to (3) which are devised from the material aspect and one or more of the following methods (4) to (6) which are devised from the process aspect can be taken in combination. The methods for the achievement are not limited to these methods, though.

(1) The magnetic characteristics, shape, etc. of the ferromagnetic powder to be contained in the lower magnetic layer are selected properly.

(2) Non-magnetic powder having a number of projections on the surface is incorporated into the lower magnetic layer.

(3) Different binders are used in the upper and lower magnetic layers.

(4) When a coating film comprising the coating composition for the lower magnetic layer (hereinafter referred to as a lower layer coating composition) and that for the upper magnetic layer (hereinafter referred to as an upper layer coating composition) are subjected to an orientation treatment in a magnetic field while wet, the conditions of the treatment are controlled.

(5) In preparing the upper and lower layer coating compositions, components of each composition are preliminary dispersed prior to kneading.

(6) The drying rate of the upper layer coating composition is controlled.

Acicular or spindle-shaped ferromagnetic powder whose axis of easy magnetization agrees with its major axial direction could be used in the lower magnetic layer, but such makes the production process complicated, and the resulting magnetic recording medium may tend to have insufficient surface smoothness. In this respect, where ferromagnetic hexagonal ferrite powder having a hexagonal tabular shape is used in the lower magnetic layer according to the method (1), the particles can be easily orientated with their major plane in parallel to the substrate by the shear force exerted during application of the lower layer coating composition. As a result, the following advantages are brought about. (a) Combined with a preferred process for producing the magnetic recording medium hereinafter described, strong magnetic flux in the perpendicular direction can be easily generated in the lower magnetic layer. (b) Where a simultaneous coating technique is adopted, orientation of the ferromagnetic powder contained in the upper layer coating composition and that in the lower layer coating composition can be controlled simultaneously, which is advantageous for productivity. (c) The resulting magnetic recording medium has satisfactory surface properties. The ferrite powder which can be used preferably includes barium ferrite, part of the Fe atoms of which may be displaced with Ti, Co, Ni, Zn, V or like atoms, and strontium ferrite. The ferrite powder can be subjected to a surface treatment that could be applied to the ferromagnetic metal powder used in the upper magnetic layer. The details of the surface treatment will be given later. The ferrite powder preferably has a tabular diameter of 10 to 100 nm, an aspect ratio of 2 to 10, and a BET specific surface area of 20 to 50 $m^2/g$. As for magnetic characteristics, the ferrite powder preferably has a coercive force of 120 to 220 kA/m, particularly 130 to 200 kA/m, and a saturation magnetization of 30 to 70 $Am^2/kg$, particularly 45 to 70 $Am^2/kg$.

According to the method (2), the axis of easy magnetization of the ferromagnetic powder in the applied lower magnetic layer composition is inhibited from being orientated horizontally in the magnetic field orientation treatment, achieving approximately random orientation.

The method (3) can be carried out by, for example, increasing the polar group content in the binder used in the lower magnetic layer over that of the binder used in the upper magnetic layer, or increasing the molecular weight of the binder used in the lower magnetic layer over that of the binder used in the upper magnetic layer. By this manipulation, the magnetic flux in the perpendicular direction in the lower magnetic layer can be increased.

In taking the method (4), when, for example, a simultaneous coating technique is used, it is a generally followed practice that hot air is blown to the coating film placed in a magnetic field to dry the coating film from its coated side. Advantageously, the coating film is heated from the side of its substrate with an orientating magnetic field applied in the perpendicular direction while the whole coating layer is wet, thereby to dry the lower coating layer at first so as to orientate and fix the axis of easy magnetization of the ferromagnetic powder in that layer in the perpendicular direction. Then at the time when the residual solvent concentration in the lower coating layer decreases to 30 to 50% by weight of the initial concentration, an orientating magnetic field is applied horizontally to orientate the axis of easy magnetization of the ferromagnetic metal powder in the upper coating layer in the horizontal direction. While not limiting, the heating is effected by, for example, hot air, infrared rays, far infrared rays, a heated roller, etc. The state of orientation of the axis of easy magnetization of the ferromagnetic powder in the upper and lower magnetic layers can be controlled by selecting the intensity of the orientating magnetic field applied, the drying temperature, the timing of magnetic field application in relation to the residual solvent concentration, and the like.

According to the method (5), the conditions of horizontal magnetic orientation can be made milder by improving the degree of dispersion of each coating composition, especially the upper layer coating composition, whereby the magnetic flux in the perpendicular direction in the lower magnetic layer can be intensified without impairing the horizontal orientation in the upper magnetic layer. A coating composition is usually prepared by conducting preliminarily dispersing operation of the ferromagnetic powder and a binder together with a portion of a solvent in a planetary mixer, etc., kneading the preliminary dispersion, diluting the dispersion with another portion of the solvent, followed by dispersing in a sand mill, etc., adding additives, such as a lubricant, to the dispersion, filtering the dispersion, and adding thereto a hardener and the remainder of the solvent. The inventors have ascertained that, when the value obtained by dividing the bulk density [g/ml] of the preliminary dispersion at the completion of the preliminary dispersing operation comprising at least the binder and powders such as ferromagnetic powder, carbon black and abrasive grains by the average specific gravity of the powder is in the range of from 0.11 to 0.20, the subsequent kneading is carried out satisfactorily to give a coating composition having excellent dispersion properties. Also, this makes it easier to obtain a susceptibility ratio of 1.3 or higher, and the resulting magnetic recording medium has satisfactory surface properties. The bulk density of the preliminary dispersion can be controlled by appropriately setting the time or temperature for dry grinding the powder or the number of revolution of a grinder used therefor or by selecting the components such as a binder added in the preliminarily dispersing operation.

The ferromagnetic powder or non-magnetic powder can previously be subjected to a wetting pretreatment with the same solvent as used for the preparation of the coating composition to have further improved dispersibility. Specifically, the powder is preferably wetted with the solvent at 15 to 80° C. for 1 to 48 hours. It is preferable that the binder and other additives be also subjected to this pretreatment.

In the method (6), it is preferable to use, in the upper layer coating composition, a mixed solvent comprising at least a solvent which has good compatibility with solvent for a main binder of the coating composition and has a boiling point of 130° C. or higher and to adjust the solids content of the upper layer coating composition at 28% by weight or lower, particularly 25% by weight or lower. In particular, where a vinyl chloride resin is used as a main binder of the upper layer coating composition, it is preferable to use cyclohexane as a component of the mixed solvent in a large quantity, e.g., 1000 parts by weight or more, particularly 1500 parts by weight or more, per 100 parts by weight of the vinyl chloride resin. In this case, the ferromagnetic metal powder is orientated satisfactorily even in a thin upper magnetic layer to give high surface smoothness.

Each layer of the magnetic recording medium will be described hereinafter the ferromagnetic metal powder used in the upper magnetic layer preferably has an average major axis length of 0.15 $\mu$m or shorter, particularly 0.10 $\mu$m or shorter, especially from 0.02 to 0.08 $\mu$m. Where, in particular, such fine ferromagnetic powder as has an average major axis length of 0.10 $\mu$m or shorter is used in the magnetic recording medium of the present invention, the output improving effect of the present invention is more appreciable than in a conventional magnetic recording medium using similarly fine ferromagnetic powder. The method of measurement of an average major axis length will be described later. While a higher effect in improving the output is considered to be produced with a smaller average particle size of the ferromagnetic powder, the smallest possible particle size attainable by the state of the art is about 0.02 $\mu$m. The ferromagnetic metal powder preferably has an acicular or spindle shape which is advantageous for obtaining surface smoothness. The ferromagnetic metal powder preferably has an acicular ratio of 3 to 20, particularly 4 to 10, and a BET specific surface area of 30 to 70 m²/g.

As for magnetic characteristics, the ferromagnetic metal powder preferably has a coercive force of 115 to 300 kA/m, particularly 130 to 250 kA/m, and a saturation magnetization of 110 to 200 Am²/kg, particularly 125 to 180 Am²/kg.

Specific examples of the above-described ferromagnetic metal powder include the one comprising iron as a major component described in Japanese Patent Laid-Open No. 293230/97, Col. 11, 1. 15 to Col., 12, 1. 32.

Any known binder can be used in the upper magnetic layer. Those described in Japanese Patent Laid-Open No. 35246/97, Col., 4, 11. 25–32 can be mentioned as examples. Of these specific examples preferred are polyurethane resins or vinyl chloride resins having a polar group, e.g., a sulfate group, a sulfoxyl group, an epoxy group, a hydroxyl group, a carboxyl group, etc., in the molecule thereof and nitrocellulose resins. The binders described above with reference to the method (3) are also preferred. The binder is preferably used in an amount of 5 to 30 parts by weight per 100 parts by weight of the ferromagnetic metal powder. It is particularly advantageous to use the above-described polyurethane resin and vinyl chloride resin at a ratio of 20/80 to 70/30 by weight.

The performance of the magnetic recording medium can further be improved by arbitrarily incorporating to the upper magnetic layer additives, such as an abrasive comprising a particulate substance having a Mohs hardness of 7 or higher (e.g., $\alpha$-alumina or chromium oxide) and having a particle size of 0.03 to 0.6 $\mu$m, particularly 0.05 to 0.3 $\mu$m, carbon black as an antistatic agent, a hardener (e.g., an isocyanate compound), and the like. Preferred amounts of the additives are: 1 to 10 parts by weight of the lubricant; 1 to 20 parts by weight, particularly 3 to 15 parts by weight, of the abrasive; 0.1 to 10 parts by weight of carbon black; and not more than 5 parts by weight, particularly 2 parts by weight or less, of the hardener; each per 100 parts by weight of the ferromagnetic metal powder.

The lower magnetic layer comprises a binder having dispersed therein various kinds of powder, such as ferromagnetic powder, non-magnetic powder, an abrasive, and carbon black.

The ferromagnetic powder includes ferromagnetic hexagonal ferrite powder and ferromagnetic metal oxide powder as well as the ferromagnetic metal powder used in the upper magnetic layer. As stated previously, ferromagnetic hexagonal ferrite powder is particularly preferred.

Examples of suitable non-magnetic powder include the inorganic powders described in Japanese Patent Laid-Open No. 35246/97, Col., 9, 1. 44 to Col., 10, 1. 24. Preferred inorganic powders include $\alpha$-iron oxide, titanium oxide, barium sulfate, zinc oxide, and calcium carbonate. It is particularly preferable for the inorganic powder to have an acicular shape with a particle size (major axis length) of 0.005 to 0.4 $\mu$m, especially 0.02 to 0.2 $\mu$m, and an acicular ratio of 2 to 20.

In addition to the above-mentioned powder components, the lower magnetic layer contains a binder, a lubricant, a hardener, and the like. The corresponding components used in the upper magnetic layer can be used in the lower magnetic layer. As to the binder, those mentioned with reference to the method (3) are particularly preferred. Preferred amounts of these components are: 5 to 50 parts by weight, particularly 10 to 30 parts by weight, of the binder; 1 to 20 parts by weight, particularly 3 to 10 parts by weight, of the lubricant; 1 to 30 parts by weight, particularly 2 to 18 parts by weight, of the abrasive; 0.3 to 30 parts by weight, particularly 1 to 20 parts by weight, of carbon black; and 0 to 12 parts by weight, particularly 0 to 8 parts by weight, of the hardener; each per 100 parts by weight of the total amount of the ferromagnetic powder and the nonmagnetic powder.

A preferred dry thickness of the lower magnetic layer, while varying in relation to relationship (3) described above, ranges from 0.2 to 3.0 $\mu$m, particularly 0.5 to 2.5 $\mu$m. If the dry thickness is smaller than 0.2 $\mu$m, deterioration in calendering characteristics, adhesion, impact resistance, durability, and the like can result. If it exceeds 3.0 $\mu$m, excessive cupping can result.

The explanations given on the upper magnetic layer and the coating composition therefor can apply appropriately to the lower magnetic layer and the coating composition therefor with respect to the other particulars not mentioned above.

Where the magnetic recording medium of the present invention is magnetic tape, it is desirable to provide a backcoating layer. Any composition known for the backcoating layer of a magnetic recording medium can be used.

For example, the composition described in Japanese Patent Laid-Open No. 35246/97, Col., 5, 1. 41 to Col., 9, 1. 4 is useful. A preferred thickness of the backcoating layer is 0.05 to 0.8 µm, particularly 0.1 to 0.7 µm.

Any known substrate for a magnetic recording medium can be used in the present invention. For example, the substrates described in Japanese Patent Laid-Open No. 35246/97, Col., 2, 11. 30–42 are employable. Preferred among them are non-magnetic substrates made of, e.g., polyester film such as polyethylene terephthalate (PET) film and polyethylene naphthalate (PEN) film, polyimide film, polyamide (PA) film and polysulfone film. In view of availability and cost, polyester film is most preferred. An easy adhesion layer may be provided on the surface of the substrate to improve the adhesion to the lower magnetic layer or the backcoating layer.

It is preferred for the substrate to have a thickness of 8 µm or smaller, more preferably 6 µm or smaller, still preferably 5 µm or smaller for obtaining an increased recording capacity. The lower limit of the thickness is preferably 3 µm. The substrate having a thickness of below 3 µm may unfavorably exhibit considerable reduction in stiffness.

One of the characteristic feature of the present invention is to be able to provide a magnetic recording medium showing excellent electromagnetic characteristics with such a thin substrate as described above. In more detail, a magnetic recording medium having a thin substrate generally has a small total thickness. In such a magnetic recording medium, output of the medium is unfavorably reduced because of the insufficient contact between the medium and the magnetic head. To the contrary, even though a thin substrate is used, the magnetic recording medium of the present invention is prevented from reduction in output and surprisingly shows excellent electromagnetic characteristics.

In view of above, a preferred thickness of the magnetic recording medium of the present invention ranges from 3.5 to 10 µm, still preferably from 4 to 8 µm, particularly preferably 4 to 7 µm. As described above, the advantageous effects such as excellent electromagnetic characteristics of the present invention is more markedly exhibited with a thin substrate, but of course the effects can be attained with a relatively thick substrate such as disks and cards.

A preferred process for producing the magnetic recording medium according to the aforesaid preferred embodiment of the present invention will then be outlined.

An upper layer coating composition and a lower layer coating composition can be applied to a substrate by simultaneous coating in a wet-on-wet coating system to form an upper magnetic layer and a lower magnetic layer having the respective prescribed thickness. That is, the upper coating layer is preferably formed while the lower coating layer is wet.

The coating film is then subjected to an orientation treatment in a magnetic field, dried, and wound. The orientation treatment and the drying can be carried out in accordance with the method (4) described above to achieve a favorable state of orientation of the ferromagnetic powder in each layer.

The dried film is then calendered. Where the magnetic recording medium is a magnetic tape, a backcoating composition is applied to the reverse side of the substrate and dried at a prescribed temperature to form a backcoating layer, followed by aging at 40 to 80° C. for 6 to 100 hours. The resulting stock film is then slit along it longitudinal direction to obtain tape of prescribed width.

The magnetic recording medium of the present invention is suitable for use as magnetic tapes, such as audio visual recording tapes, e.g., DVC tapes, 8 mm video tapes, and DAT tapes; and data recording tapes, e.g., DLT, DDS tapes, ¼ in. data cartridge tapes, and data 8 mm tapes. It is also applicable as other types of magnetic recording media, such as magnetic disks including flexible disks.

EXAMPLES

Having generally described the present invention, a further understanding can be obtained by reference to certain specific examples which are provided herein for purposes of illustration only and are not intended to be limiting unless otherwise specified. All the parts and percents are given by weight unless otherwise noted.

Before going into Examples and Comparative Examples, the preparation of the upper layer coating composition and the lower layer coating composition used therein is described.

Preparation of Coating Composition

Powdered components such as ferromagnetic powder, a binder, and a portion of a solvent were preliminarily dispersed in a planetary mixer. The solids content of the preliminary dispersion was adjusted to make the bulk density to average specific gravity ratio of the resulting powdery dispersion fall within a range of from 0.13 to 0.17. The solids content itself was adjusted within a range of from 75 to 93%. The dispersion was kneaded in a continuous twin-screw extruder capable of applying strong shear. After the solids content was adjusted to 20 to 50% by addition of another portion of the solvent, the mixture was further dispersed in a sand mill. The remainder of the solvent was added thereto to control the coating properties. The dispersion was filtered through a filter having an absolute filtration precision of 1 µm. Finally, a lubricant and a hardener were added to the filtered dispersion to prepare a coating composition for an upper magnetic layer or for a lower magnetic layer. The solids content of the resulting coating compositions, the weight ratio of cyclohexanone (used as a solvent) to vinyl chloride resin (used as a binder) in the upper layer coating composition, and the thickness of each layer are shown in Table 1 below. The bulk density of the preliminary dispersion and the average specific gravity of the powder were measured as follows.

Measurement of Bulk Density of Preliminary Dispersion:

The powdery preliminary dispersion (before kneading) was put in a 200-ml measuring cylinder up to the gage mark, and the cylinder was tapped lightly on the bottom three times. The volume V (ml) of the tapped powdery dispersion was read, and the weight M (g) of the preliminary dispersion was measured. The bulk density was obtained from M/V as an average of 5 measurements.

Measurement of Average Specific Gravity of Powder:

The specific gravity of each powder was measured with a pycnometer in accordance with JIS K5101, and an average of 5 measurements was obtained. The average specific gravity of the powders to be mixed up was obtained from the following formula. The term "powder" as used herein is intended to mean powder that does not dissolve in a solvent, such as magnetic powder, non-magnetic powder, carbon black, abrasive, etc.

Average Specific Gravity of Mixed Powders =

$$\frac{\text{Total Weight of the Mixed Powders}}{\sum \frac{\text{Weight of Each Powder}}{\text{Specific Gravity of Each Powder}}}$$

Example 1

(1) Preparation of Coating Composition

An upper layer coating composition and a lower layer coating composition having the following respective formulations were prepared according to the process described above.

| Formulation of Upper Layer Coating Composition | |
|---|---|
| Acicular ferromagnetic metal powder mainly comprising iron (coercive force: 158 kA/m; saturation magnetization: 143 Am$^2$/kg; average major axis length: 0.11 μm; acicular ratio: 6) | 100 parts |
| α-Alumina (particle size: 0.2 μm) | 9 parts |
| Carbon black (particle size: 50 nm) | 0.4 part |
| Sulfate-containing vinyl chloride resin (sulfate group content: 3 × 10$^{-4}$ equiv./g; GPC number average molecular weight (Mn): 17000) | 10 parts |
| Sulfoxyl-containing polyurethane resin (sulfoxyl group content: 3 × 10$^{-5}$ equiv./g; GPC Mn: 22,000) | 7 parts |
| Stearic acid | 2 parts |
| 2-Ethylhexyl oleate | 1.5 parts |
| Polyisocyanate hardener (solid content: 75%) | 4.4 parts |
| Methyl ethyl ketone | 132 parts |
| Toluene | 88 parts |
| Cyclohexanone | 210 parts |

| Formulation of Lower Layer Coating Composition | |
|---|---|
| Ferromagnetic hexagonal ferrite powder (hexagonal tabular barium ferrite; coercive force: 153 kA/m; saturation magnetization: 58 Am$^2$/kg; BET specific surface area: 36 m$^2$/g; average tabular diameter: 0.03 μm; aspect ratio: 5) | 60 parts |
| Acicular α-Fe$_2$O$_3$ (major axis length: 0.10 μm; acicular ratio:10; specific surface area: 48 m$^2$/g) | 40 parts |
| α-Alumina (particle size: 0.2 μm) | 6 parts |
| Carbon black (particle size: 20 nm) | 2 parts |
| Sulfate-containing vinyl chloride resin (sulfate group content: 4 × 10$^{-4}$ equiv./g; GPC Mn: 20,000) | 12 parts |
| Sulfoxyl-containing polyurethane resin (sulfoxyl group content: 4 × 10$^{-5}$ equiv./g; GPC Mn: 25,000) | 8 parts |
| Stearic acid | 4 parts |
| 2-Ethylhexyl oleate | 1.5 parts |
| Butyl stearate | 2 parts |
| Myristic acid | 2 parts |
| Polyisocyanate hardener (solid content: 75%) | 4 parts |
| Methyl ethyl ketone | 90 parts |
| Toluene | 60 parts |
| Cyclohexanone | 90 parts |

(2) Preparation of Magnetic Recording Medium

The upper layer coating composition and the lower layer coating composition were simultaneously applied by a wet-on-wet coating technique to a 4.5 μm thick PEN film by means of an extrusion die coater at a coating speed of 300 m/min to give the respective dry thickness shown in Table 1. While the coating film was wet, it was passed through a solenoid type magnet of 0.4 T to apply a magnetic field in the horizontal direction, dried at 60 to 100° C., and taken up. The coating film was then subjected to supercalendering under conditions of 90° C. in roll surface temperature, 3 kN/cm in linear pressure, and 150 m/min in line speed to form upper and lower magnetic layers. A backcoating composition having the following formulation was applied to the back surface of the PEN film to a dry thickness of 0.5 μm at a coating speed of 200 m/min, dried at 90° C., and taken up. The coated film was aged at 50° C. for 16 hours and slit into an 8 mm wide strip to obtain a magnetic tape.

| Formulation of Backcoating Composition | |
|---|---|
| Carbon black (particle size: 28 nm) | 38 parts |
| Carbon black (particle size: 52 nm) | 2 parts |
| Nipporan 2301 (a trade name of polyurethane produced by Nippon Polyurethane Industry Co., Ltd.; solid content: 40%) | 50 parts |
| Nitrocellulose (a product of Hercules Powder Co.; viscosity index: ½ sec) | 20 parts |
| Polyisocyanate hardener (solid content: 75%) | 4 parts |
| Copper phthalocyanine | 5 parts |
| Stearic acid | 2 parts |
| Methyl ethyl ketone | 120 parts |
| Toluene | 129 parts |
| Cyclohexanone | 120 parts |

Example 2

A magnetic tape was prepared in the same manner as in Example 1, except that the acicular α-Fe$_2$O$_3$ was excluded from the lower layer coating composition, 40 parts of the ferromagnetic hexagonal ferrite powder used in the lower layer coating composition was replaced with 100 parts of ferromagnetic hexagonal ferrite powder having the characteristics shown in Table 1, and the thickness of the lower magnetic layer was changed as shown in Table 1.

Example 3

A magnetic tape was prepared in the same manner as in Example 1, except that the amounts of the ferromagnetic hexagonal ferrite powder and the acicular α-Fe$_2$O$_3$ in the lower layer coating composition were changed to 10 parts and 90 parts, respectively.

Examples 4 and 5

A magnetic tape was prepared in the same manner as in Example 1, except for using ferromagnetic hexagonal ferrite powder having the characteristics shown in Table 1 in the lower layer coating composition.

Example 6

A magnetic tape was prepared in the same manner as in Example 1 with the following exceptions. In preparing the lower layer coating composition, the amount of carbon black was changed to 4 parts; the sulfoxyl-containing polyurethane resin was replaced with one having a sulfoxyl group content of 6×10$^{-5}$ equiv./g and a GPC Mn of 30,000; 60 parts of the ferromagnetic hexagonal ferrite powder was replaced with 70 parts of ferromagnetic hexagonal ferrite powder having the characteristics shown in Table 1; and the amount of the acicular α-Fe$_2$O$_3$ was changed to 30 parts. Further, the thickness of the lower magnetic layer was changed as shown in Table 1.

Example 7

A magnetic tape was prepared in the same manner as in Example 1, except for changing the thickness of the lower magnetic layer as shown in Table 1 and altering the method of magnetic field orientation as follows.

While the coated films of the upper and lower layer compositions formed by simultaneous coating were wet, the film was passed through a solenoid type magnet having a perpendicular magnetic field intensity of 0.2 T to conduct perpendicular magnetic field orientation in the perpendicular direction. While being subjected to the perpendicular orientation in the solenoid type magnet and just after having passed through the solenoid type magnet, the film was dried with infrared lamps which were set on the side of the substrate over the region where the perpendicular magnetic field was applied and the region downstream the magnet, until the residual solvent concentration of the lower magnetic layer decreased to a half of the solvent concentration of the initial composition. The coated film was then passed through a solenoid type magnet having a horizontal magnetic field intensity of 0.5 T to conduct horizontal magnetic field orientation.

Example 8

A magnetic tape was prepared in the same manner as in Example 1 with the following exceptions. In preparing the upper layer coating composition, the acicular ferromagnetic metal powder mainly comprising iron as used in Example 1 was replaced with one having a coercive force of 188 kA/m, a saturation magnetization of 147 Am$^2$/kg, an average major axis length of 0.065 µm, and a BET specific surface area of 61 m$^2$/g. In preparing the lower layer coating composition, the amounts of the ferromagnetic hexagonal ferrite powder and the acicular α-Fe$_2$O$_3$ were changed both to 50 parts. The thickness of the lower magnetic layer was changed as shown in Table 1.

Example 9

A magnetic tape was prepared in the same manner as in Example 8 with the following exceptions. In the preparation of the upper layer coating composition, the mixture to be preliminarily dispersed was subjected to the following pretreatment. Five parts of a 6/6/1 mixed solvent of methyl ethyl ketone/toluene/cyclohexanone were added to 100 parts of the acicular ferromagnetic metal powder, and the mixture was kept at 25° C. for 5 hours and then subjected to the preliminary dispersion.

In the preparation of the magnetic tape, the magnetic field orientation was carried out by applying a magnetic field in the horizontal direction by use of a combination of two sets of solenoid type magnets, one having a magnetic field intensity of 0.3 T and the other 0.2 T, while the coating films were wet. The films were then dried at 30 to 110° C. and wound up.

Example 10

A magnetic tape was produced in the same manner as in Example 1, except for using acicular ferromagnetic metal powder having a coercive force of 162 kA/m, saturation magnetization of 145 Am$^2$/kg, average major axis length of 0.10 µm and acicular ration of 5.

Comparative Example 1

A magnetic tape was prepared in the same manner as in Example 1, except for using a lower layer coating composition having the following formulation and changing the thickness of the lower magnetic layer as shown in Table 1.

| Formulation of Lower Layer Composition | |
|---|---|
| Acicular Co-γ-FeO$_x$ powder (1.4 ≦ x ≦ 1.5) (coercive force: 71 kA/m; saturation magnetization: 78 Am$^2$/kg; average major axis length: 0.15 µm) | 100 parts |
| Carbon black (particle size: 50 nm) | 0.4 part |
| Sulfate-containing vinyl chloride resin (sulfate group content: 3 × 10$^{-4}$ equiv./g; GPC Mn: 17,000) | 10 parts |
| Sulfoxyl-containing polyurethane resin (sulfoxyl group content: 3 × 10$^{-5}$ equiv./g; GPC Mn: 22,000) | 7 parts |
| Stearic acid | 2 parts |
| 2-Ethylhexyl oleate | 1.5 parts |
| Polyisocyanate hardener (solid content: 75%) | 4.5 parts |
| Methyl ethyl ketone | 70 parts |
| Toluene | 40 parts |
| Cyclohexanone | 110 parts |

Comparative Example 2

A magnetic tape having a magnetic layer/non-magnetic layer structure was prepared in the same manner as in Example 1, except that the ferromagnetic hexagonal ferrite powder was not used in the lower layer coating composition, and the amount of the acicular α-Fe$_2$O$_3$ in the lower layer coating composition was increased to 100 parts.

Comparative Example 3

A magnetic tape having a single magnetic layer structure was prepared in the same manner as in Example 1 by applying a coating composition which had the same formulation as the lower layer composition of Example 1 except that the ferromagnetic hexagonal ferrite powder and the acicular α-Fe$_2$O$_3$ were replaced with 100 parts of ferromagnetic hexagonal tabular barium ferrite powder having a coercive force of 159 kA/m, a saturation magnetization of 57 Am$^2$/kg, a BET specific surface area of 37 m$^2$/g, an average tabular diameter of 0.035 µm, and an aspect ratio of 2.5 to the dry thickness shown in Table 1.

Comparative Example 4

A magnetic tape was prepared in the same manner as in Example 1, except for using the upper layer coating composition of Example 8 and the lower layer coating composition of Comparative Example 2.

Evaluation:

In order to evaluate the performance of the magnetic tapes obtained in Examples and Comparative Examples, measurements were made as to the average major axis length of the ferromagnetic powder (shown in Table 1) and the items shown in Table 2 in accordance with the following methods.

1. Center-line Surface Roughness (Ra)

The surface roughness (Ra) was measured with an optical profilometer (Maxim 3D5700, manufactured by Zygo). A Fizeau lens (×40) was used, and a Cylinder correction was made. Measurements were taken at 5 points to obtain an average.

2. Thickness of Upper and Lower Magnetic Layers

A laser hollow gauge meter (LGH-110, manufactured by Mitsutoyo; resolving power: 0.01 µm) was used for measurement. Every measurement was taken at 10 points to obtain an average. At first the total thickness (t$_0$) of the magnetic tape was measured. Then the upper and low magnetic layers were removed to expose the base film by scrubbing with a cotton applicator impregnated with methyl ethyl ketone (MEK) while taking care that MEK might not go round to the back side, and the thickness ($t_1$) of the base film was measured. The total thickness ($t_m$) of the upper and lower magnetic layers was obtained by subtracting $t_1$ from $t_0$ ($t_m = t_0 - t_1$).

A photograph (×50,000) was taken of the longitudinal cross section of the magnetic tape under a transmission electron microscope (TEM) as described below, and the thickness ratio of the upper and lower magnetic layers was measured at 20 points with a slide gauge. The thickness of the upper magnetic layer ($t_U$) and that of the lower magnetic layer ($t_L$) were calculated from the average thickness ratio and the $t_m$ (the total thickness of the upper and lower magnetic layers) obtained by means of a stylus method.

3. Average Major Axis Length and Average Inclination of Ferromagnetic Powder in Upper Magnetic Layer A slice about 0.1 μm in thickness was cut out of the magnetic tape in the longitudinal direction with a diamond cutter, and the section was photographed at several arbitrarily selected points through a TEM (×30,000), and the photographic film was printed with a magnification increased to 300,000 to obtain several micrographs for each sample for measuring and observing the average major axis length (or the average tabular diameter in Comparative Example 3) and the state of orientation of the ferromagnetic powder in the upper magnetic layer. The major axis length and inclination of the ferromagnetic powder particles in every micrograph were measured. The inclination of the ferromagnetic powder was obtained by measuring the absolute angle (0 to 90°) formed between the interface between the lower magnetic layer and the base film as a base plane and the axis of easy magnetization of the ferromagnetic powder (i.e., the major axial direction in all Examples and Comparative Examples 1, 2 and 4 or the direction perpendicular to the tabular plane in Comparative Example 3). Care should be taken that the ferromagnetic powder particles under measurement might not be localized in the vicinities of abrasive grains.

The length and angle data of the ferromagnetic particles were brought together for each micrograph, and those particles having a length of 80% or more of the maximum length were chosen for each micrograph. A hundred particles were chosen in total from the several micrographs for each tape sample. The average length and average angle were calculated from the data on the 100 particles thus selected, the former taken as an average major axis length, and the latter as an average inclination, of the ferromagnetic powder in the upper magnetic layer of the magnetic tape.

The TEM observation was carried out with II-7000 manufactured by Hitachi, Ltd. at an accelerating voltage of 100 kV 4. Measurement of Magnetic Characteristics The magnetic characteristics were measured on a disk specimen 11 mm in diameter with a vibrating sample magnetometer (VSM) (VSM-P7-15PC, manufactured by Toei Kogyo K.K.). A magnetic field was applied to a maximum intensity of 796 kA/m (=10 kOe). Corrections for a demagnetization field were not made. After the VSM was stabilized sufficiently, it was calibrated by use of a nickel specimen of the same shape. Where the magnetic tape was of less width than 11 mm, pieces of the tape were joined at the edges with a nonmagnetic adhesive tape with no gap therebetween to make a width 11 mm or more, from which a disk specimen was punched.

4.1. Preparation of Specimen

The magnetic characteristics of the magnetic tape were measured on a disk specimen prepared above. The value $t_m$ as obtained above was taken as the total thickness of the upper and lower magnetic layers.

In taking measurements on the lower magnetic layer, the magnetic layer side of the magnetic tape was polished with diamond powder or an abrasive tape to scrape the upper magnetic layer, and a disk specimen 11 mm in diameter was then punched. Removal of the upper magnetic layer was confirmed by the absence of the elements inherent to the upper magnetic layer which was confirmed by means of an Auge electronic spectroscopic analyzer. The thickness of the lower magnetic layer was obtained by the method described above (2. Thickness of Upper and Lower Magnetic Layers) using a laser hollow gauge. The coercive force in the horizontal direction $Hc_L$, coercive force in the perpendicular direction $Hc\perp_L$, saturation magnetization in the horizontal direction $Ms_L$, and residual magnetization in the horizontal direction $Mr_L$ were measured, from which was obtained the residual flux density in the horizontal direction $Br_L$.

The magnetic characteristics of the upper magnetic layer were not obtained by direct measurements but by calculations based on the measured magnetic characteristics of the magnetic tape and the lower magnetic layer, and the thickness of the upper and lower magnetic layers. That is, they were obtained by subtracting the magnetic characteristic values of the lower magnetic layer from the respective magnetic characteristics of the whole magnetic tape.

4.2. Measurement of Initial Magnetization Curve, Susceptibility Ratio Curve, and $\chi_{max}$ The disk specimen of the magnetic tape was demagnetized by an alternating current and set at a prescribed position in a VSM so that a magnetic field was applied in parallel to the normal on one side of the disk specimen. The intensity of the applied magnetic field was increased by 3.98 kA/m (=50 Oe) up to a maximum of 796 kA/m (=10 kOe) at a time constant of 0.3 sec and a magnetic field sweeping speed of 79.6 kA/(m·min) (=1 kOe/min). The applied magnetic field and the magnetization were recorded on a computer for every rise of the magnetic field and plotted with the applied magnetic field as an abscissa and the magnetization as ordinate to prepare an initial magnetization curve.

The difference of magnetization for every 3.98 kA/m (=50 Oe) was read from the initial magnetization curve, and the difference was divided by 3.98 kA/m (=50 Oe) and the total volume of the upper and lower magnetic layers to obtain a magnetic susceptibility at each magnetic field applied, which was plotted in the ordinate with the applied magnetic field in the abscissa to obtain a magnetic susceptibility curve. The maximum magnetic susceptibility of the curve was taken as $\chi_{max}$, and the magnetic susceptibility at a magnetic field of 8 kA/m as $\chi_8$. $\chi_{max}$ and $\chi_8$ were converted to the SI unit system.

4.3. Measurement of Coercive Force and Residual Flux Density

The specimen was set at a prescribed position of a VSM so that a magnetic field might be applied in the horizontal direction. The measuring conditions were 0.03 sec in time constant, 796 kA/m (=10 kOe) in maximum applied magnetic field, and 398 kA/(m·min) (=5 kOe/min) in magnetic field sweeping speed. Measurement of the coercive force in the perpendicular direction $Hc\perp$ was carried out in the same manner except that the magnetic filed was applied in parallel to the normal of the plane of the magnet layer. The coercive force is a half of the absolute difference between two H values at M=0 on the M-H loop (a plot of magnetization M (ordinate) vs. magnetic field H (abscissa)) prepared by the measurement with VSM. The residual flux density is obtained by dividing a half of the absolute difference between two residual magnetization values Mr at H=0 in the M-H loop by the volume of the magnetic layers.

5. Measurement of Electromagnetic Output and C/N ratio of Magnetic Tape

Measurement was carried out by a drum tester method at a drum rotational speed of 6 m/sec using a magnetic head for an Hi-8 magnetic tape (head gap: 0.2 μm). Signals of square waves having a frequency of 14 MHz (λ=0.43 μm) were recorded at a recording current at which each magnetic tape attained the maximum output for the recording frequency used. Under these conditions, the signals were recorded by use of a signal oscillator at the above frequency. The reproduction output at the same frequency was read from a spectrum analyzer, and an average of 8 readings was taken as an output of the magnetic tape. Further, signals of 14 MHz were recorded, and the ratio of the average reproduction output (C) (n=8) at the same frequency to the average reproduction output (N) at a frequency of the recording frequency ±1 MHz (n=8), i.e., C/N, was obtained. In Examples 8 and 9 and Comparative Example 4 signals of square waves having a frequency of 20 MHz were recorded.

TABLE 1

| | Upper Layer Coating Composition | | | | | Lower Layer Coating Composition | | | | | | |
|---|---|---|---|---|---|---|---|---|---|---|---|---|
| | Ferromagnetic Powder | | | | Dry | Ferromagnetic Powder | | | | | | Dry |
| | Avg. Major Axis Length (μm) | Acicular Ratio | Cyclohexanone/ vinyl chloride resin Wt. Ratio | Solids Content (%) | Thickness (μm) | Hc (kA/m) | σs (Am²/kg) | BET Specific Surface Area (m²/g) | Tabular Diameter (μm) | Aspect Ratio | Solids Content (%) | Thickness (μm) |
| Ex. 1 | 0.11 | 6 | 21 | 23.6 | 0.10 | 153 | 58 | 36 | 0.030 | 5 | 39.1 | 1.2 |
| Ex. 2 | 0.11 | 6 | 21 | 23.6 | 0.10 | 145 | 60 | 34 | 0.030 | 5 | 39.0 | 2.6 |
| Ex. 3 | 0.11 | 6 | 21 | 23.6 | 0.10 | 153 | 58 | 36 | 0.030 | 5 | 39.2 | 1.2 |
| Ex. 4 | 0.11 | 6 | 21 | 23.6 | 0.10 | 93 | 56 | 34 | 0.040 | 4 | 38.9 | 1.2 |
| Ex. 5 | 0.11 | 6 | 21 | 23.6 | 0.10 | 202 | 57 | 34 | 0.040 | 4 | 38.9 | 1.2 |
| Ex. 6 | 0.11 | 6 | 21 | 23.6 | 0.10 | 155 | 59 | 35 | 0.035 | 7 | 39.2 | 1.3 |
| Ex. 7 | 0.11 | 6 | 21 | 23.6 | 0.10 | 153 | 58 | 36 | 0.030 | 5 | 39.1 | 1.3 |
| Ex. 8 | 0.065 | 5 | 21 | 23.4 | 0.10 | 153 | 58 | 36 | 0.030 | 5 | 38.8 | 1.1 |
| Ex. 9 | 0.065 | 5 | 21 | 23.4 | 0.10 | 153 | 58 | 36 | 0.030 | 5 | 38.8 | 1.1 |
| Ex. 10 | 0.10 | 5 | 21 | 23.1 | 0.10 | 153 | 58 | 36 | 0.030 | 5 | 39.0 | 1.2 |
| Comp. Ex. 1 | 0.11 | 6 | 21 | 23.6 | 0.10 | 71 | 78 | 38 | 0.15*³ | 8*⁴ | 35.9 | 2.6 |
| Comp. Ex. 2 | 0.11 | 6 | 21 | 23.6 | 0.10 | —*⁵ | —*⁵ | —*⁵ | —*⁵ | —*⁵ | 39.0 | 1.2 |
| Comp. Ex. 3 | 0.035*¹ | 2.5*² | 7 | 39.1 | 2.70 | —*⁶ | —*⁶ | —*⁶ | —*⁶ | —*⁶ | —*⁶ | —*⁶ |
| Comp. Ex. 4 | 0.065 | 5 | 21 | 23.4 | 0.10 | —*⁵ | —*⁵ | —*⁵ | —*⁵ | —*⁵ | 39.0 | 1.2 |

Note:
*¹Tabular diameter; *²Aspect ratio; *³Major axis length; *⁴Acicular ratio; *⁵The lower layer was non-magnetic; *⁶Single layer structure (no lower layer)

TABLE 2

| | Magnetic Recording Medium | | Upper Magnetic | | Lower Magnetic Layer | | | | | | | Characteristics | |
|---|---|---|---|---|---|---|---|---|---|---|---|---|---|
| | Hc (kA/m) | Ra (nm) | Inclination of Ferromagnetic Powder (°) | Hc$_U$ (kA/m) | Br$_L$ (T) | Hc$_L$ (kA/m) | Hc⊥$_L$ (kA/m) | χ$_{max}$/χ$_8$ | Hc⊥$_L$/Hc$_L$ | Br$_L$t (T·μm) | Hc⊥$_L$/Hc$_U$ | Output (dB) | C/N (dB) |
| Ex. 1 | 156 | 1.9 | 9.1 | 159 | 0.075 | 150 | 165 | 2.8 | 1.10 | 0.09 | 1.04 | 1.6 | 2.1 |
| Ex. 2 | 148 | 2.5 | 12.5 | 157 | 0.128 | 140 | 160 | 2.1 | 1.14 | 0.33 | 1.02 | 0.8 | 1.1 |
| Ex. 3 | 157 | 1.8 | 8.7 | 158 | 0.012 | 154 | 160 | 1.6 | 1.04 | 0.01 | 1.01 | 0.4 | 0.9 |
| Ex. 4 | 131 | 2.2 | 10.5 | 157 | 0.074 | 94 | 100 | 2.3 | 1.06 | 0.09 | 0.64 | 0.7 | 1.2 |
| Ex. 5 | 185 | 2.0 | 10.2 | 155 | 0.071 | 189 | 212 | 2.5 | 1.12 | 0.09 | 1.37 | 0.9 | 1.2 |
| Ex. 6 | 152 | 2.1 | 7.9 | 160 | 0.089 | 140 | 177 | 3.0 | 1.26 | 0.12 | 1.11 | 1.9 | 2.5 |
| Ex. 7 | 154 | 2.2 | 8.6 | 157 | 0.074 | 143 | 173 | 2.9 | 1.21 | 0.10 | 1.10 | 2.1 | 2.8 |
| Ex. 8 | 182 | 1.7 | 10.9 | 194 | 0.061 | 145 | 167 | 3.1 | 1.15 | 0.07 | 0.86 | 2.4*¹ | 3.1*¹ |
| Ex. 9 | 184 | 1.6 | 10.6 | 197 | 0.063 | 143 | 171 | 3.2 | 1.20 | 0.07 | 0.87 | 2.8*¹ | 3.5*¹ |
| Ex. 10 | 157 | 1.8 | 10.1 | 160 | 0.075 | 149 | 166 | 2.9 | 1.11 | 0.09 | 1.04 | 2.0 | 2.5 |
| Comp. Ex. 1 | 99 | 2.3 | 10.1 | 158 | 0.17 | 71 | 48 | 1.0*² | 0.68 | 0.43 | 0.30 | -1.4 | -1.6 |
| Comp. Ex. 2 | 159 | 1.8 | 9.0 | 159 | —*³ | —*³ | —*³ | 1.0*³ | —*³ | —*³ | —*³ | 0.0 (ref.) | 0.0 (ref.) |
| Comp. Ex. 3 | 155 | 3.2 | 16.2 | 155 | —*⁴ | —*⁴ | —*⁴ | 1.8 | —*⁴ | —*⁴ | —*⁴ | -0.7 | -0.8 |
| Comp. Ex. 4 | 195 | 1.6 | 11.2 | 195 | —*³ | —*³ | —*³ | 1.0*³ | —*³ | —*³ | —*³ | 0.0*¹ (ref.) | 0.0*¹ (ref.) |

Note:
*¹Recording frequency = 20 MHz; *²No peak in the magnetic susceptibility curve; *³The lower layer was nonmagnetic; *⁴Single layer structure with no lower layer.

As is apparent from the results shown in Table 2, the magnetic tapes of Examples according to the present invention have satisfactory surface properties and exhibit higher outputs and higher C/N ratios at short wavelengths than the comparative magnetic tapes.

Obviously, numerous modifications and variations of the present invention are possible in light of the above teachings. It is therefore to be understood th at within the scope of the appended claims, the invention may be practiced other wise than as specifically described herein.

This application claims the priority of Japanese Patent Applications No. 10-126525 filed May 8, 1998, No. 10-127736 filed May 11, 1998 and No. 10-206962 filed Jul. 22, 1998 which are incorporated herein by reference.

What is claimed is:

1. A magnetic recording medium comprising a substrate having an uppermost magnetic layer formed by applying a coating composition comprising ferromagnetic metal powder dispersed in a binder and a lower magnetic layer which is adjacent to the uppermost magnetic layer, wherein said uppermost magnetic layer has an average dry thickness of 0.03 to 0.5 μm, and the ferromagnetic metal powder contained in the uppermost magnetic layer is orientated in the horizontal direction of the magnetic recording medium, said magnetic recording medium has a coercive force of 120 kA/m or higher in the horizontal direction thereof, and a ratio of a maximum magnetic susceptibility $\chi_{max}$ with an external magnetic field applied in the direction perpendicular to the magnetic recording medium to a magnetic susceptibility $\chi_8$ with an external magnetic field of 8 kA/m applied in the same direction, $\chi_{max}/\chi_8$, is 1.3 or higher.

2. The magnetic recording medium according to claim 1, wherein the coercive force $Hc_L$ of said lower magnetic layer in the horizontal direction of the magnetic recording medium and the coercive force $Hc\perp_L$ of said lower magnetic layer in the perpendicular direction of the magnetic recording medium satisfy relationship (1):

$$0.9 \leq Hc\perp_L/Hc_L \tag{1}$$

3. The magnetic recording medium according to claim 1, wherein the coercive force $Hc\perp_L$ [kA/m] of said lower magnetic layer in the perpendicular direction of the magnetic recording medium and the shortest recording wavelength $\lambda$[μm] of said magnetic recording medium satisfy relationship (2):

$$190 \times \lambda^{1/5} - 50 \leq Hc\perp_L \leq 190 \times \lambda^{1/5} + 50 \tag{2}$$

4. The magnetic recording medium according to claim 1, wherein the residual flux density $Br_L$ [T (Tesla)] of said lower magnetic layer in the horizontal direction of the magnetic recording medium and the thickness t (μm) of said lower magnetic layer satisfy relationship (3):

$$0.02 \leq Br_L \times t \leq 0.3 \tag{3}$$

5. The magnetic recording medium according to claim 1, wherein the coercive force $Hc_U$ of said uppermost magnetic layer in the horizontal direction of the magnetic recording medium and the coercive force $Hc\perp_L$ of said lower magnetic layer in the perpendicular direction of the magnetic recording medium satisfy relationship (4):

$$0.6 \leq Hc\perp_L/Hc_U \leq 1.7 \tag{4}$$

wherein the coercive force $Hc_U$ is 130 kA/m or higher.

6. The magnetic recording medium according to claim 1, wherein said ferromagnetic metal powder has an average major axis length of 0.10 μm or less.

7. The magnetic recording medium according to claim 1, wherein said substrate comprises a polyester film having a thickness of 3 to 5 μm.

* * * * *